United States Patent [19]
Thurston et al.

[11] 3,856,532
[45] Dec. 24, 1974

[54] PHOTOGRAPHIC SILVER HALIDE EMULSION CONTAINING A SUPERSENSITISING COMBINATION

[75] Inventors: Elvin Frederick William Thurston; John Gabriel Valentine Scott, both of Ilford, England

[73] Assignee: Ilford Limited, Ilford, Essex, England

[22] Filed: Apr. 18, 1973

[21] Appl. No.: 352,484

[30] Foreign Application Priority Data
Apr. 26, 1972  Great Britain .................... 19408/72

[52] U.S. Cl. .................................... 96/124, 96/137
[51] Int. Cl. ............................................... G03c 1/14

[58] Field of Search ............................. 96/124, 137

[56] References Cited
UNITED STATES PATENTS

| | | | |
|---|---|---|---|
| 3,666,480 | 5/1972 | Shiba et al. ............................ | 96/124 |
| 3,718,475 | 2/1973 | Shiba et al. ............................ | 96/124 |
| 3,745,015 | 7/1973 | Van Pee et al. ....................... | 96/137 |

*Primary Examiner*—J. Travis Brown
*Attorney, Agent, or Firm*—Wenderoth, Lind & Ponack

[57] ABSTRACT

The present invention relates to a photographic silver halide emulsion or emulsion layer which comprises a super-sensitising combination of (1) a bis-benzothiazole or other bis-azole trimethincyanine dye and (2) a bis-benzimidazole trimethincyanine.

7 Claims, No Drawings

PHOTOGRAPHIC SILVER HALIDE EMULSION CONTAINING A SUPERSENSITISING COMBINATION

Photographic silver halide emulsions have a certain natural sensitivity to light but this is restricted to a short range of wavelengths in the ultra-violet and/or blue regions of the spectrum. The effect of incorporating a sensitising dye is to impart to the emulsion sensitivity to light of other wavelengths. It has been known for some years that by incorporating in the emulsion, together with the sensitising dye, a second substance which may or may not itself be a sensitising dye, there may sometimes be imparted to the emulsion an additional sensitivity beyond that which can be regarded as the sum effect of the separate substances. Combinations of sensitising dye and other substances which give this better result are known as supersensitising combinations.

The present invention relates to a new supersensitising combination of the type just referred to.

According to the present invention there is provided a light sensitive photographic silver halide material which comprises a super-sensitising combination which consists of a sensitising dye of the formula (1)
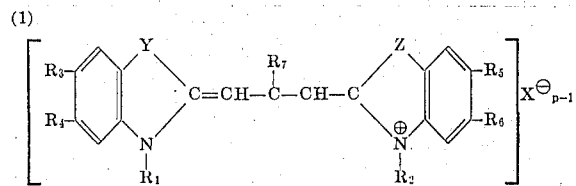

wherein $R_1$ and $R_2$ are each alkyl groups, or a group A-Q where A is a straight or branched alkylene chain containing 1-6 carbon atoms and Q is an amide, carboxylic acid or sulphonic acid group $R_3$, $R_4$, $R_5$ and $R_6$ are the same or different and each represent a hydrogen or halogen atom, or an alkyl, aryl, hydroxy or alkoxy group, $R_7$ is a lower alkyl group, Y and Z are each sulphur or selenium atoms or one is an oxygen atom and the other is a sulphur or selenium atom, X is an anion and p is 1 in the case of a betaine-like molecular structure caused by the presence of a sulphonic acid in either or both $R_1$ and $R_2$ or by the presence of a carboxylic acid in both $R_1$ and $R_2$ and is 2 in the case of a non-betaine-like molecular structure, together with a symmetrical trimethincyanine dye of the formula (2)
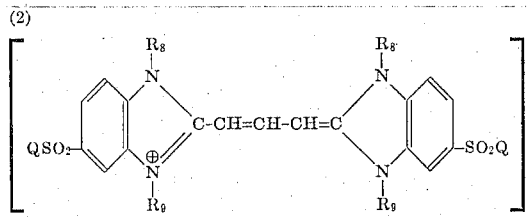

wherein $R_8$ is an alkyl group and $R_9$ is an alkyl, aryl, sulphoalkyl, hydroxyalkyl, carboxyalkyl, aralkyl or carboxybenzyl group, or an acylsulphamoylalkyl group of the formula $-(CH_2)_n SO_2 NHCOR_{10}$ where $n$ is an integer from 1 to 6 $R_{10}$ is an alkyl group, or an alkyl or aralkyl sulphamoylalkyl group of the formula $-(CH_2)_n SO_2 NHR_{11}$ where $n$ is an integer from 1 to 6 and $R_{11}$ is an alkyl or aralkyl group, Q is a phenyl or phenyl substituted with at least one halogen, alkyl or alkoxy substituent, U is an anion and $q$ is 1 in the case of a betaine-like molecular structure caused by the presence of a sulphonic acid or carboxylic acid group in $R_9$ and is 2 in the case of a non-betaine-like molecular structure.

Preferably in the dyes of formula (2) $R_9$ is a sulphoalkyl group.

It is to be understood that under certain conditions the dyes both of formula (1) and of formula (2) which contain either two carboxylic acid groups or two sulphonic acid groups may be present in the emulsion as a salt. Dyes of this type for example dye A as set forth below and dye 1 as set forth below are usually prepared as a salt and under certain conditions of coating the dye may be present in the coated emulsion still as a salt.

By lower alkyl group is meant an alkyl group containing 1 to 4 carbon atoms.

Preferably the sensitising dyes of formula (1) correspond to the formula (3)
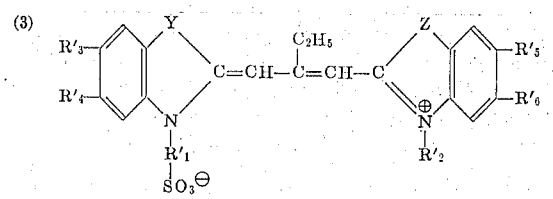

and the dyes of formula (2) correspond to the formula (4)
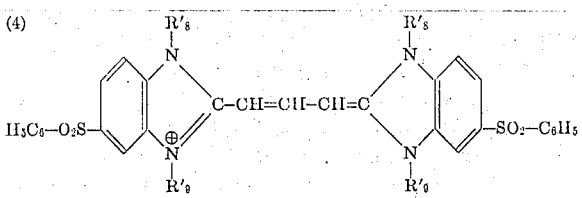

in formula (3) and (4) Y and Z have the above indicated meaning, $R_1'$ represents a lower alkylene groups, such as $(CH_2)_3$, $R_2'$ represents a lower alkyl or sulphoalkyl group, such as methyl, ethyl, sulphopropyl, $R_3'$ a hydrogen atom or a lower alkyl group, such as methyl, $R_4'$ a hydrogen atom, a lower alkyl or alkoxy group, such as methyl or ethoxy, $R_5'$ a hydrogen atom or a lower alkyl group, such as methyl, $R_6'$ a lower alkyl or alkoxy group, such as methyl or methoxy, $R_8'$ a lower alkyl group, such as ethyl and $R_9'$ a lower sulphoalkyl group.

Preferably 0.01 g to 0.5 g of each sensitising dye of formula (1) and (2) per 1,5 g moles of silver present in the emulsion can be conveniently used.

The silver halide emulsion to which the supersensitising combination of dyes hereinbefore set forth may be added or may comprise any of the normal silver halide and halide mixtures used in photographic material for example silver chloride, silver bromide, silver iodobromide and silver chlorobromide. The emulsion binder may be gelatin or it may comprise other polymeric substances for example polyvinyl alcohol, polyvinyl pyrrolidone, ethyl cellulose or an alginate either alone or in admixture with the gelatin. There may be present in the emulsion layer a dispersion of a water-insoluble polymeric substance for example a polyacrylate or methacrylate.

The silver halide emulsion to which the supersensitising combination of dyes hereinbefore set forth may be added may contain the usual sulphur sensitisers for example thiourea or thiosulphate and they may in addition be sensitised with a noble metal, for example gold.

Furthermore it may comprise polyethylene glycol sensitisers and the usual tetraazaindene stabilisers and may contain further stabilisers for example cadmium or mercury salts. The emulsion may also contain development antifoggants. The emulsion may also contain solour couplers, filter dyes and acutance dyes.

By use of the combination of sensitising dyes as just set forth a valuable effect is obtained and is illustrated by the specific Example.

In the Example which follows the following dyes of formula (1) were used:

A. Anhydro-bis-[5,6-dimethyl-3-(3-sulphopropyl)-2-benzoselenazole] β-ethyltrimethincyanine hydroxide, sodium salt, which has the formula

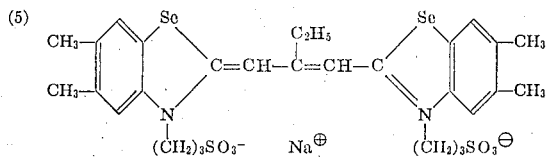

B. Anhydro-[5-ethoxy-3-(3-sulphopropyl)-2-benzothiazole] (3-ethyl-5-methyl-2-benzoselenazole) β-ethyltrimethincyanine hydroxide, which has the formula

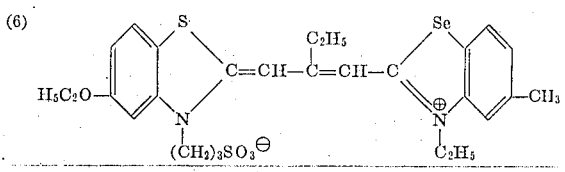

C. Anhydro-[3-(3-sulphopropyl)-2-benzothiazole] (5-methoxy-3-methyl-2-benzoxazole) β-ethyltrimethincyanine hydroxide which has the formula

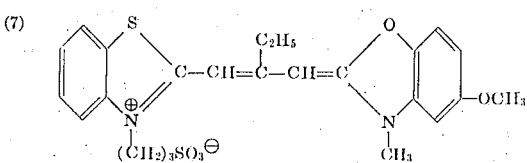

Also in the Example the following dye of formula (2) was used:

Dye 1. Anhydro-bis-[1-ethyl-5-phenylsulphonyl-3-(3-sulphopropyl)-2-benzimidazole] trimethincyanine hydroxide, sodium salt, which has the formula:

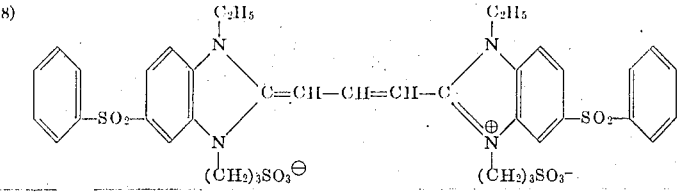

EXAMPLE

The above dyes A, B, C and 1 were added to a high speed silver iodobromide emulsion containing 5.4 mol per cent of silver iodide, after digestion of the emulsion, the quantity shown for each dye being the amount per 1.5 g moles of silver halide. The emulsion was divided into portions, and each portion was coated onto a film strip. After exposure the strips were developed and the realtive log speed of the emulsion were determined. The speeds are relative log speeds measured to light passing through a suitable filter, the term "relative log speed" being directly related to the logarithm of the reciprocal of the exposure in metre-candle-seconds required to produce a density of 0.1 above fog. A higher

TABLE

| Dye g | Dye g | SO.1 (0.2" exposure through filter No. 204 | SO.1 (0.3" exposure through filter No. 404 | SO.1 (⅛" exposure to white light |
|---|---|---|---|---|
| A 0.1 | | 2.69 | | |
| | 1 0.1 | <2.50 | | |
| A 0.06 | 1 0.04 | 2.95 | | |
| B 0.1 | | | <3.0 | 4.0 |
| | 1 0.1 | | 3.09 | 4.01 |
| B 0.03 | 1 0.07 | | | 4.09 |
| B 0.02 | 1 0.08 | | 3.30 | |
| C 0.2 | | 3.60 | | 4.09 |
| | 1 0.2 | <2.5 | | 4.07 |
| C 0.17 | 1 0.03 | 3.68 | | 4.21 |
| C 0.125 | 1 0.075 | | | 4.23 | figure indicates a higher speed. The filters used were the tricolour green, No. 404 and the tricolour red, No. 204 of the Ilford Colour Filters handbook.

These results show that when a combination of a dye of formula (1) and of formula (2) are present together in the silver halide emulsion a useful increase in the red speed of the emulsion is obtained.

We claim:

1. A photographic silver halide material which contains a super-sensitising combination which consists essentially of a sensitising dye of the formula

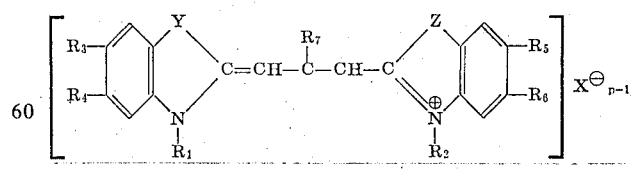

wherein $R_1$ and $R_2$ are each alkyl groups, or a group A-Q where A is a straight or branched alkylene chain containing 1-6 carbon atoms and Q is an amide, carboxylic acid or sulphonic acid group, $R_3$, $R_4$, $R_5$ and $R_6$ are the same or different and each represents a hydrogen or halogen atom, or an alkyl, aryl, hydroxy or alkoxy group, $R_7$ is a lower alkyl group, Y and Z are each sulphur or selenium atoms or one is an oxygen atom and the other is a sulphur or selenium atom, X is an anion and $p$ is 1 in the case of a betaine-like molecular structure caused by the presence of a sulphonic acid in either or both $R_1$ and $R_2$ or by the presence of a carboxylic acid in both $R_1$ and $R_2$ and is 2 in the case of a non-betaine-like molecular structure, together with a symmetrical trimethincyanine dye of the formula

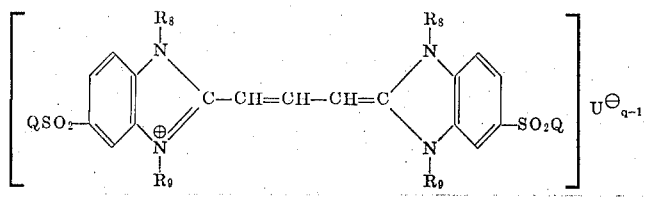

wherein $R_8$ is an alkyl group and $R_9$ is an alkyl, aryl, sulphoalkyl, hydroxyalkyl, carboxyalkyl, aralkyl or carboxybenzyl group, or an acylsulphamoylalkyl group of the formula $-(CH_2)_n SO_2 NHCOR_{10}$ where $n$ is an integer from 1 to 6 and $R_{10}$ is an alkyl group, or an alkyl or aralkyl sulphamoylalkyl group of the formula $-(CH_2)_n SO_2 NHR_{11}$ where $n$ is an integer from 1 to 6 and $R_{11}$ is an alkyl or aralkyl group, Q is a phenyl or phenyl substituted with at least one halogen, alkyl or alkoxy substituent, U is an anion and $q$ is 1 in the case of a betaine-like molecular structure caused by the presence of a sulphonic acid or carboxylic acid group in $R_9$ and is 2 in the case of a non-betaine-like molecular structure.

2. A silver halide material according to claim 1, wherein in the dye of the formula secondly set forth in claim 1 $R_9$ is a sulphoalkyl group.

3. A photographic silver halide material according to claim 1, which contains a supersensitising combination which consists essentially of a sensitising dye of the formula

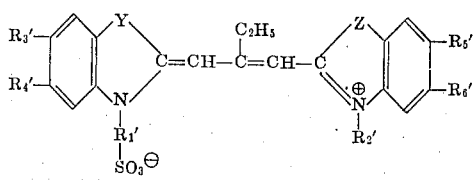

together with a symmetrical trimethincyanine dye of the formula

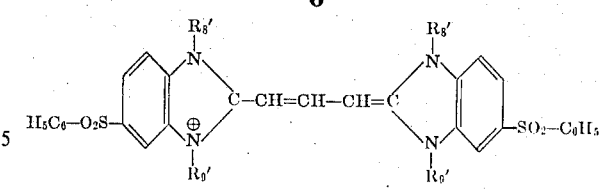

wherein Y and Z have the meaning given in claim 1, $R_1'$ represents a lower alkylene group, $R_2'$ represents a lower alkyl or sulphoalkyl group, $R_3'$ represents a hydrogen atom or a lower alkyl group, $R_4'$ represents a hydrogen atom, a lower alkyl group or a lower alkoxy group, $R_5$ represents a hydrogen atom or a lower alkyl group, $R_6'$ represents a lower alkyl or alkoxy group, $R_8'$ represents a lower alkyl group and $R_9'$ represents a lower sulphoalkyl group.

4. A photographic silver halide material according to claim 3 the symmetrical trimethincyanine dye of which corresponds to the formula

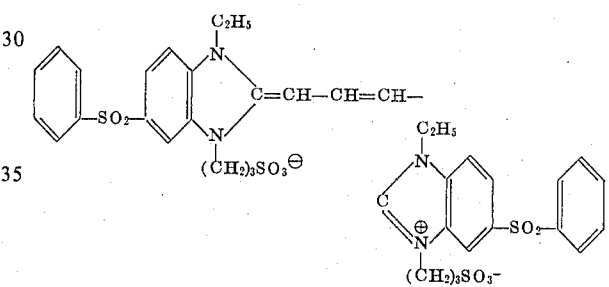

5. A silver halide material according to claim 1, which contains from 0.01 g to 0.5 g of each sensitising dye of the two formulae set forth in claim 1 per 1.5 g moles of silver present in the emulsion.

6. A photographic silver halide emulsion which contains a supersensitising combination as defined in claim 1.

7. A photographic silver halide emulsion layer which contains a supersensitising combination as defined in claim 1.

* * * * *